(12) United States Patent
Friedrich

(10) Patent No.: US 7,613,987 B2
(45) Date of Patent: Nov. 3, 2009

(54) METHOD FOR WIRELESS DATA TRANSMISSION

(75) Inventor: Ulrich Friedrich, Ellhofen (DE)

(73) Assignee: Atmel Automotive GmbH, Heilbronn (DE)

( * ) Notice: Subject to any disclaimer, the term of this patent is extended or adjusted under 35 U.S.C. 154(b) by 360 days.

(21) Appl. No.: 11/080,441

(22) Filed: Mar. 16, 2005

(65) Prior Publication Data

US 2005/0210360 A1 Sep. 22, 2005

(30) Foreign Application Priority Data

Mar. 16, 2004 (DE) .................. 10 2004 013 837

(51) Int. Cl.
*H03M 13/00* (2006.01)
(52) U.S. Cl. ..................... 714/781; 375/150
(58) Field of Classification Search .......... 714/781; 375/150
See application file for complete search history.

(56) References Cited

U.S. PATENT DOCUMENTS

| | | | |
|---|---|---|---|
| 5,479,416 A | 12/1995 | Snodgrass et al. | |
| 5,608,739 A | 3/1997 | Snodgrass et al. | |
| 5,742,618 A * | 4/1998 | Lowe | 714/797 |
| 6,130,623 A | 10/2000 | McClellan et al. | |
| 6,307,517 B1 | 10/2001 | Lee | |
| 6,377,176 B1 | 4/2002 | Lee | |
| 2002/0094830 A1 | 7/2002 | Wenzel et al. | |
| 2003/0102961 A1 | 6/2003 | Fischer et al. | |
| 2003/0151497 A1 | 8/2003 | Cole et al. | |
| 2004/0036626 A1 | 2/2004 | Chan et al. | 340/870 |
| 2005/0024186 A1 | 2/2005 | Friedrich | |
| 2005/0123133 A1* | 6/2005 | Stewart et al. | 380/46 |
| 2005/0201450 A1* | 9/2005 | Volpi et al. | 375/150 |

FOREIGN PATENT DOCUMENTS

| | | |
|---|---|---|
| CN | 1037812 C | 3/1998 |
| DE | 101 01 918 A1 | 7/2002 |
| DE | 101 58 442 A1 | 3/2003 |
| DE | 103 36 308 A1 | 3/2005 |
| EP | 0 831 614 A2 | 3/1998 |
| EP | 0 853 288 A2 | 7/1998 |
| EP | 0 935 211 A2 | 8/1999 |
| WO | WO 92/10162 A1 | 6/1992 |
| WO | WO 99/26364 A1 | 5/1999 |

* cited by examiner

*Primary Examiner*—Guy J Lamarre
*Assistant Examiner*—Sam Rizk
(74) *Attorney, Agent, or Firm*—Muncy, Geissler, Olds & Lowe, PLLC

(57) ABSTRACT

A method for wireless data transmission between a base station and one or more, in particular passive, transponders is provided, in which electromagnetic carrier waves are emitted by the base station. Data comprising successive characters are transmitted from a respective transponder to the base station by modulation and backscattering of the electromagnetic carrier waves, and a respective one of the characters is coded and transmitted by a respective transponder within a predefined time interval. Within at least one of the predefined time intervals, a safeguard character formed from the data to be transmitted is transmitted in addition to the character to be transmitted.

20 Claims, 2 Drawing Sheets

```
Process()
Begin
   Case return_mode:
      When soft_NRZI:
         If data = 0 Then
            CRC_zone = S_1/2
         ELSE
            CRC_zone = S_3/4
         END_IF
      When 3Phase1:
         CRC_Zone = S_3/4
      When others (FM0 and NRZI):
         If data = 0 THEN
            CRC_Zone = NOT S_1/4
         ELSE
            CRC_Zone = S_1/2 AND NOT S_3/4
         END_IF
   END_CASE
END_Process
```

Fig. 1

```
If return_mod = 3Phase1 Then
   Mod = crc2send
ELSE
   If data = crc2send Then
      Mod = mod_data
   ELSE
      Mod = NOT mod_data
   END_IF
END_IF
```

Fig. 2

METHOD FOR WIRELESS DATA TRANSMISSION

This nonprovisional application claims priority under 35 U.S.C. § 119(a) on German Patent Application No. DE 102004013837, which was filed in Germany on Mar. 16, 2004, and which is herein incorporated by reference.

BACKGROUND OF THE INVENTION

1. Field of the Invention

The present invention relates to a method for wireless data transmission between a base station and one or more transponders.

2. Description of the Background Art

Such transmission methods between one or more base stations or readers and one or more transponders may be used for example in contactless identification systems or so-called radio frequency identification (RFID) systems. Sensors, for example for temperature measurement, may also be integrated on the transponder. Such transponders may also be referred to as remote sensors.

The transponders or the transmitting and receiving devices thereof are not usually provided with an active transmitter for the data transmission to the base station. Such non-active systems are referred to as passive systems if they do not have their own energy supply, and are referred to as semipassive systems if they have their own energy supply. Passive transponders draw the energy required to supply them from the electromagnetic field emitted by the base station.

So-called backscatter coupling is generally used for data transmission from a transponder to the base station with UHF or microwaves in the far field of the base. For this purpose, the base station emits electromagnetic carrier waves which are modulated and reflected by the transmitting and receiving device of the transponder in accordance with the data to be transmitted to the base station by means of a modulation method. The typical modulation methods for this purpose include amplitude modulation, phase modulation, and amplitude shift keying (ASK) subcarrier modulation, in which a frequency or a phase angle of the subcarrier is changed.

The data to be transmitted comprise successive characters which are usually coded and transmitted by a transponder in each case within a predefined time or character interval. In the case of a binary transmission, the value of a character is either "0" or "1". Various methods are known for coding a character.

One coding method, typically called 3phase1 coding, is described, for example, in ISO WD 18000-6 mode 3 dated Jan. 2, 2002. In this case, the significance of a character is coded by the time difference between a synchronization mark generated by the base station and a state change of a modulation signal that is generated by a transponder. The coding is effected synchronously with the synchronization marks. The synchronization marks are also referred to as "notch".

Another coding method is typically called non return to zero inverted (NRZI) coding. In this case, a "1" is represented by an edge or modulation state change in a serially transmitted signal, known as a line code, at the beginning of a character or bit interval. If a "0" is transmitted, a change in the serial signal or in the modulation state does not take place. A variant of this method is typically called soft-NRZI coding, in which an edge change takes place in an offset manner with respect to a clock signal or a synchronization mark. Such a method is described in applicant's application, which has the German Application No. DE 10 2004 01 3885.0, which was filed on Mar. 16, 2004, and which is incorporated herein by reference.

Another coding method is typically called FM0 or differential biphase (DBP) coding, which is described for example in the textbook by Klaus Finkenzeller, RFID-Handbuch [RFID manual], 3rd edition, HANSER, 2002, see in particular chapter 6.1 Coding in baseband. In this case, a "0" is represented by an arbitrary edge in the center of the bit interval. If a "1" is transmitted, an edge change does not take place in the center of the interval. Independently of the value of the character to be transmitted, an edge change is generated at the start of each bit interval, thereby facilitating clock recovery.

Since the signals backscattered by the transponders have a very low power, corruption of the transmitted characters or data can easily occur on account of interference sources in the vicinity of the transponders. By way of example, the power of the backscattered signals may be in the region of −100 dBm whereas the power of interference signals, for example caused by mobile telephones, may be in the region of −54 dBm. In order to increase the transmission security, safeguard characters are usually sent subsequent to (payload) characters or (payload) data to be transmitted, which are formed from the data with the aid of mathematical operations. What are usually involved in this case are so-called parity bits and/or so-called cyclic redundancy codes having a specific length, generally 16 bits.

Attaching the safeguard characters increases the time required for the data transmission in accordance with the number of safeguard characters or safeguard bits additionally transmitted. This adversely affects the usable transmission bandwidth since the safeguard characters serve only for safeguarding and not for transmitting payload data.

One possibility for compensating for this increase in the transmission time is to increase the transmission rate. However, increasing the transmission rate presupposes increasing the oscillator frequency in the respective transponder, as a result of which its current consumption increases and the transmission range consequently decreases. Furthermore, the required transmission bandwidth increases. This is possible, however, only within the limits of the respective standards prescribed by the legislator. Since the noise energy likewise increases with the bandwidth, a higher sensitivity of the receiving part of the base station is additionally necessary.

SUMMARY OF THE INVENTION

It is therefore an object of the present invention to provide a method for wireless data transmission with which comparatively high transmission rates can be obtained with improved utilization of the available bandwidth and which enables a large transmission range and high degree of transmission security.

According to an embodiment of the invention, within at least one of the predefined time intervals, a safeguard character formed from the data to be transmitted may be transmitted in addition to the character to be transmitted. As a result, it is possible to dispense with transmitting safeguard characters subsequent to the payload data, since the safeguard characters are already transmitted during the transmission of the payload data in one or more time or character intervals. This reduces the required transmission duration without having to increase the transmission rate and thereby the required transmission bandwidth. A combination of conventional safeguard mechanisms in which the safeguard characters are transmitted subsequently increases the Hamming distance, thereby improving the possibility of error detection and error correction. In this case, the underlying conventional coding method can be extended in such a way that the extension remains compatible with conventional systems.

In a further embodiment, the modulation is a PSK modulation or an ASK modulation. Such modulation methods are simple to implement and have a high interference immunity.

In yet another embodiment, the coding can be a 3phase1 coding, an FM0 coding or an NRZI coding. A soft-NRZI coding may preferably be used as a variant of the NRZI coding. The coding methods mentioned may be extended proceeding from the standard in such a way that they remain compatible with conventional systems. The extension may be effected in such a manner that the (payload) character is conventionally coded within the time or bit interval and the safeguard character is coded by a change in the modulation state at points in time at which a change in the modulation state is not effected in accordance with the standard.

The time interval can be predefined by the base station by successive synchronization marks or "notches". Such a synchronous or quasi-synchronous transmission increases the transmission security and simplifies the transmission method.

The synchronization or bit delimitation marks can be generated by field gaps or by a phase reversal of the electromagnetic carrier wave. A double sideband modulation with a suppressed carrier may advantageously be used for this purpose, thereby improving the bandwidth utilization and increasing the transmission security and the transmission range.

The safeguard character can be part of a cyclic redundancy code (CRC) formed from the data. As an alternative or in combination, the safeguard character can be a parity bit. In this way, it is possible to partially or completely dispense with transmitting the CRC and/or the parity bit subsequent to the data transmission.

The safeguard character can be coded by an additional modulation state that does not serve for coding a character. This enables a simple separation of the (payload) characters from the safeguard characters and facilitates compatibility with conventional systems. Further, the additional modulation state can be generated by driving a varactor in the input circuit of the transponder. By way of example, the additional modulation state may be generated by applying identical potentials to the varactor terminals.

The safeguard character can be transmitted within the predefined time interval after the character to be transmitted. This enables a simple separation of the (payload) characters from the safeguard characters and facilitates compatibility with conventional systems.

Also, the characters can be part of an identification bit sequence which is transmitted from a transponder to the base station during a transponder selection method. Arbitration or anticollision methods serve for selecting individual or a plurality of transponders from a multiplicity of transponders. A first method of this type is described for example in German patent application 10336308.4, which corresponds to U.S. Publication No. 2005024186, the entire contents of which are hereby incorporated by reference into the present application. A further selection method is described in ISO WD 18000-6 Mode 3 dated Jan. 2, 2002, in which the selection is likewise effected on the basis of an identification bit sequence. The selection methods operate in full duplex mode, as a result of which the selection duration decreases. The identification bit sequence is transmitted character by character or bit by bit from the transponder to the base station. In order to safeguard the characters transmitted by the transponder during the selection method, in particular the bits of the identification bit sequence, a 16-bit CRC is conventionally formed and is transmitted subsequent to the data or the message. According to an embodiment of the invention, in addition to or instead of the safeguard data transmitted subsequently, at least one safeguard character is already transmitted during the transmission of the (payload) characters or the bits of the identification bit sequence. This reduces the time required for arbitration and/or increases the interference immunity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 schematically shows an algorithm for generating a multiplexer selection signal in pseudocode representation;

FIG. 2 schematically shows an algorithm for generating a modulation state in accordance with a value of a safeguard character in pseudocode representation;

DETAILED DESCRIPTION

Figure 3:
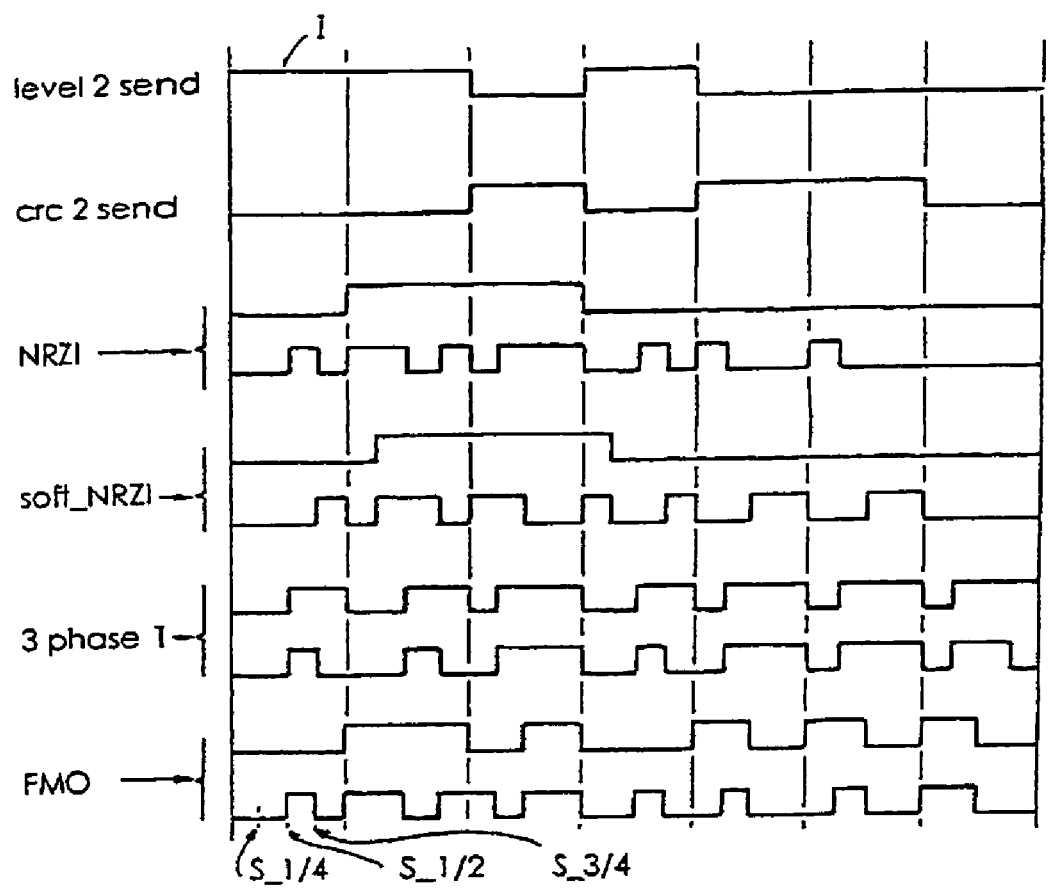
FIG. 3 schematically shows a timing diagram of a modulation state during transmission of a character sequence using the pseudocode shown in FIGS. 1 and 2.

FIG. 1 shows an example of a VHDL-based pseudocode for determining the value of a variable CRC_zone, the value of which controls the state of a multiplexer selection signal. VHDL is a hardware description language used in the design of digital circuits. In order to facilitate reading, the multiplexer selection signal is also designated by CRC_zone hereinafter. The pseudocode shown proceeds as a process cyclically on an execution unit suitable for this in a transponder (not shown). The multiplexer selection signal CRC_zone serves for driving a multiplexer (not shown) in the transponder, which applies to its output, in a manner dependent on the multiplexer selection signal CRC_zone, either a modulation signal corresponding to the value of the character to be transmitted or a modulation signal corresponding to the value of the safeguard character. The multiplexer selection signal CRC_zone consequently serves for insertion of the modulation state corresponding to the value of the safeguard character within a time interval provided for coding a character to be transmitted.

In this case, the respective time interval is divided into four regions of equal size, variables or signals $S\_¼$, $S\_½$ and $S\_¾$ shown in FIG. 1 assuming the logical value "1" starting from a point in time within a respective time interval from which the assigned region within the respective time interval has been reached. The signal $S\_¼$ assumes the value "1" starting from the point in time from which one quarter of the duration of the time interval has elapsed. The signal $S\_½$ assumes the value "1" starting from the point in time from which half of the duration of the time interval has elapsed, and the signal $S\_¾$ assumes the value "1" starting from the point in time from which three quarters of the duration of the time interval have elapsed. Such a division of a time interval is shown by way of example in FIG. 3. The associated time references may be communicated to the transponders for example by transmitting one or more references within a header section of a data packet which is transmitted from the base station in the context of a data transmission to one or more transponders.

The multiplexer selection signal CRC_zone is set in a manner dependent on a variable return_mod. The variable return_mod indicates the coding method set and may have, as a value, soft_NRZI representative of a soft-NRZI coding method, 3phase1 representative of a 3phase1 coding method, FM0 representative of the coding method of the same name, or NRZI representative of the coding method of the same name. For determining the multiplexer selection signal CRC_zone, the value of a variable data, which reflects the value of the (payload) character or (payload) datum to be transmitted, is additionally taken into account, apart from in the 3phase1 coding method.

FIG. 2 shows, for example, a VHDL-based pseudocode for determining the value of a variable Mod, the value of which controls the modulation state assigned to the safeguard character to be transmitted. In order to facilitate reading, this modulation state assigned to the variable Mod is likewise designated by Mod hereinafter. The modulation state Mod is present at the output of the multiplexer in a manner dependent on the multiplexer selection signal CRC_zone and is likewise determined in a manner dependent on the variable return_mod. If 3phase1 is set as the coding method, the modulation state Mod corresponds to the value of a safeguard character crc2send that is to be sent. In the case of other coding methods, a case discrimination takes place on the basis of the value of the variable data. If the value of the variable data, i.e. the value of the character or datum to be transmitted, is equal to the value of the variable crc2send, the modulation state Mod is set to be equal to the value of a variable mod_data, which reflects the value of the modulation state currently present. Otherwise, the value is set to the inverted value of the variable mod_data.

FIG. 3 shows a timing diagram of the modulation state during the transmission of a character sequence used in the pseudocodes shown in FIGS. 1 and 2 with the use of different coding methods. The boundaries of respective time intervals I within which a character and also a safeguard character are in each case coded and transmitted are depicted by broken lines in the vertical direction. The interval boundaries are determined by the base station by transmission of synchronization marks (not shown). The interval durations are substantially constant.

The first line shows the temporal profile of a signal level2send, which corresponds to the character sequence of the transponder that is to be sent. The values of the characters to be sent are "1", "1", "0", "1", "0", "0" and "0". The second line shows the temporal profile of the signal or the variable crc2send assigned to the signal, i.e. of the safeguard characters. The values of the safeguard characters are "0", "0", "1", "0", "1", "1" and "0". Consequently, the following pairs of values are to be coded and transmitted per interval I: [1, 0], [1, 0], [0, 1], [1, 0] [0, 1] [0, 1] and [0, 0]. The temporal profile of the modulation states for the coding methods NRZI, soft_NRZI, 3phase1 and FM0 is plotted starting from the third line, the respective upper line showing the profile of the modulation state in accordance with the standard, i.e. without additional transmission of safeguard characters, and the respective lower line showing the profile according to the invention in which the respective safeguard character is concomitantly transmitted within a respective interval I.

The profile of the modulation state is derived below by way of example on the basis of the pseudocodes of FIG. 1 and FIG. 2.

That profile if an NRZI method is taken as a basis as a coding method serves as an example. The profiles for the remaining coding methods are determined analogously on the basis of the pseudocodes of FIGS. 1 and 2.

Firstly, the value of the variable CRC_zone within the first interval is determined with reference to FIG. 1. The value of the variable return_mod is NRZI, and the value of CRC_zone is consequently determined in a manner dependent on the value of the variable data. The variable data represents the value of the character to be transmitted and is identical to level2send, i.e. its value is "1" in the first interval. The value of the variable CRC_zone is consequently equal to the value of the variable S_½ logically ANDed with the inverted value of the variable S_¾. The value of the variable S_½ is "0" in the first half of the interval and "1" in the second half. The value of the variable S_¾ is "1" in the last quarter of the interval and otherwise "0". It emerges from the logic combination that the value of the variable CRC_zone is "1" in a region beginning in the center of the interval up to three quarters of the interval and otherwise "0". The multiplexer is consequently driven by the signal CRC_zone in such a way that the conventional modulation signal is present at its output apart from the region between half and three quarters of the interval, said conventional modulation signal corresponding to the assigned upper line of the standard coding method and representing the character to be transmitted.

In the region in which the signal CRC_zone is "1", the modulation state defined by the variable Mod is present at the output of the multiplexer. This modulation state codes the safeguard character crc2send that is to be transmitted. In the first interval, the safeguard character crc2send has the value "0". The value of the variable Mod is determined in accordance with FIG. 2. On account of the coding method set and since the character data that is to be transmitted is not identical to the safeguard character crc2send that is to be transmitted, Mod is produced by inverting mod_data. The variable mod_data reflects the value of the modulation state currently present; its value is "0". Consequently, the value of Mod is determined as "1". The temporal profile of the modulation signal as illustrated in FIG. 3 results, which is "0" in the regions between the beginning and half and also three quarters and the end of the first interval and "1" in the remaining region.

In order to determine the signal profile in the second interval, once again firstly the value of the variable CRC_zone within the second interval is determined with reference to FIG. 1. Since the underlying values of the variables return_mod, data and S_½ and S_¼ within the second interval are identical, the result is the same profile of the value of the variable CRC_zone in the second interval, i.e. the coding of the safeguard character crc2send is only inserted in the region between half and three quarters of the second interval, otherwise the signal profile corresponds to the coding standard represented in the overlying line. Since the character data or level2send that is to be transmitted does not correspond to the safeguard character crc2send that is to be transmitted, in accordance with FIG. 2 the value of the variable Mod is produced by inverting the value of the variable mod_data, which is "1". The temporal profile of the modulation signal as illustrated in FIG. 3 is produced, which is "1" in the regions between the beginning and half and also three quarters and the end of the first interval and "0" in the remaining region.

In order to determine the signal profile in the third interval, once again firstly the value of the variable CRC_zone within the third interval is determined with reference to FIG. 1. The value of the variable data is now "0", i.e. the value of the variable CRC_zone is produced by inverting the value of the variable or the signal S_¼. This means that the coding of the safeguard character crc2send is inserted in a region between the beginning and one quarter of the third interval, otherwise the signal profile corresponds to the coding standard represented in the overlying line. Since the character data or level2send that is to be transmitted does not match the safeguard character crc2send that is to be transmitted, in accordance with FIG. 2 the value of the variable Mod is produced by inverting the value of the variable mod_data, which is "1". The temporal profile of the modulation signal as illustrated in FIG. 3 is produced, which is "0" in the region between the beginning and one quarter and "1" in the remaining region.

The further profile of the modulation signal can be determined in a simple manner with reference to FIGS. 1 and 2. In principle, firstly the region in which the modulation state assigned to the safeguard character is inserted within the respective interval is determined with reference to FIG. 1. The modulation state of the remaining region of the interval remains unchanged in comparison with the standard coding method. The value of the modulation state then results in accordance with FIG. 2.

In a further embodiment, it is possible, particularly when there is a high bandwidth available or if the data transmission rate is small in relation to the available bandwidth, to use so-called sub-carriers, which are described for example in the text book by Klaus Finkenzeller, RFID-Handbuch, 3rd edition, HANSER, 2002, see in particular chapter 6.2.4 modulation methods with a sub-carrier. If only one sub-carrier is used, the coding described above can be used as a mask, i.e. the profiles of the modulation state as shown in FIG. 3 serve for switching the sub-carrier on and off, the sub-carrier being switched on in the case of one of the two modulation states that occur and being switched off in the other modulation state. If two sub-carriers are available, it is possible to effect a switch-over between the sub-carriers on the basis of the modulation states shown.

Figure 4:
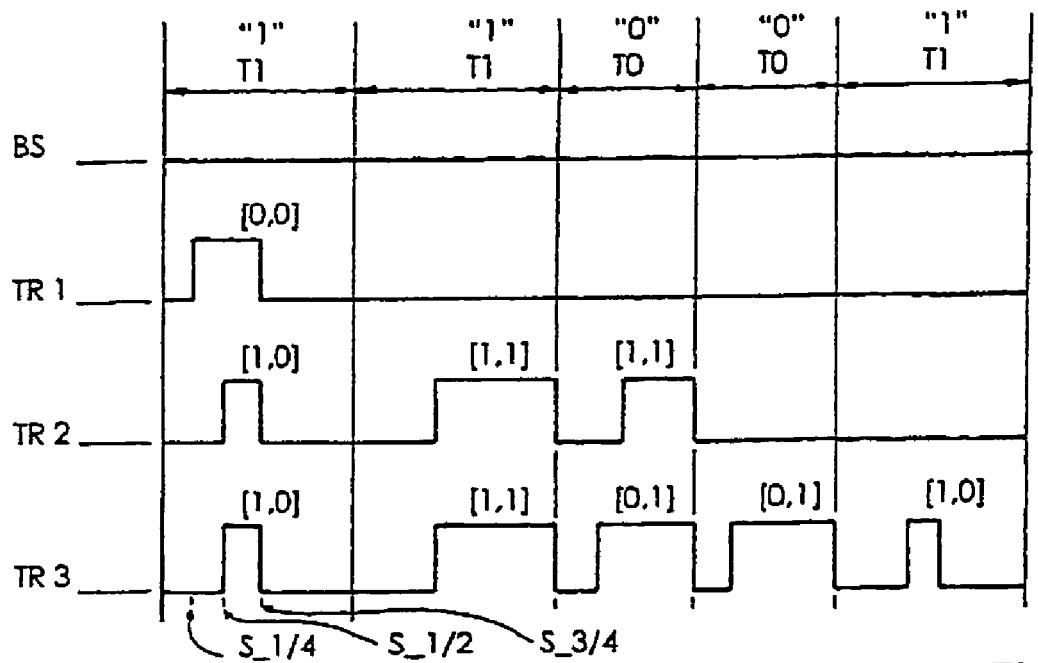
FIG. 4 schematically shows a timing diagram of the modulation state of three transponders during a selection method.

FIG. 4 shows a timing diagram of the modulation state of three transponders TR1 to TR3 during a selection or arbitration method, the coding being based on a 3phase1 coding which is extended, as already shown in FIG. 3, in such a way that a character and also a safeguard character are transmitted within an interval.

In this case, the selection method preferably takes place as described in ISO WD 18000-6 Mode 3 dated Jan. 2, 2002. The selection of one or a group of transponders is effected on the basis of a selection bit sequence transmitted by the base station BS. The selection bit sequence is transmitted bit by bit to the transponders TR1 to TR3. The significance of a bit of the selection bit sequence is coded on the basis of the time duration between in each case two successive synchronization marks. In the example shown, a time duration T0 between two synchronization marks codes the value "0" and a time duration T1 codes the value "1". Consequently, the interval width is not constant, in contrast to the interval width of FIG. 3.

All the required transmission parameters, for example T0, T1 and further arbitrary references or constants, may be exchanged between the data transmission subscribers BS and TR1 to TR3 in so-called header sections that are usually sent at the beginning of a data transmission.

In full duplex operation, the transponders TR1 to TR3 backscatter an associated bit of their identification bit sequence to the base station BS at the same time as the transmission of a selection bit by the base station BS in an interval formed by two successive synchronization marks. The respective transponders TR1 to TR3 compare the selection bit with the associated bit of their identification bit sequence. If the bits are identical, the respective transponder participates further in the selection method. If the bits are not identical, the respective transponder changes to a silence mode and does not participate any further in the current selection process.

In order to safeguard the bits of their identification bit sequence which are transmitted by the transponders TR1 to TR3, a safeguard character or a safeguard bit is simultaneously transmitted in the corresponding interval. Transmission of a CRC subsequent to the transmission of the identification bit sequence is not absolutely necessary. This reduces the time required for arbitration.

The coding of the characters transmitted by the transponders TR1 to TR3 and also of the safeguard characters is effected analogously to the pseudocodes shown in FIGS. 1 and 2. The shorter interval having the width T0 is chosen as a reference interval width, which is divided into four regions of equal length which are assigned the signals S_¼, S_½ and S_¾ shown in FIG. 2. In the case of intervals having the duration T1, the modulation state remains constant after the time T0 up to the duration T1.

In FIG. 4, the selection bit has the value "1" in the first interval. The associated bit of the identification bit sequence of the transponder TR1 has the value "0". TR1 transmits its identification bit and also a safeguard character or bit having the value "0". Since the selection bit and the identification bit do not match for the transponder TR1, it changes to a silence mode and does not participate any further in the current selection process. The associated bit of the identification bit sequence of the transponders TR2 and TR3 in each case has the value "1". TR2 and TR3 transmit their respective selection bit and also the safeguard character or bit having the value "0" in each case.

In the second interval, the value of the selection bit is likewise "1". The values of the corresponding identification bits of the transponders TR2 and TR3 match the value of the selection bit, and both transponders TR2 and TR3 consequently participate further in the selection method. The value of the respective safeguard bits is "1".

In the third interval, the value of the selection bit is "0". Since the value of the identification bit of the transponder TR2 is "1", the latter does not participate any further in the selection method. TR2 transmits the value "1" as a safeguard bit. TR3 transmits the value "0" as an identification bit and the value "1" as the safeguard bit. The selection method is subsequently continued over two intervals, the value of the selection bit and of the corresponding identification bit matching in each case. The transponder TR3 is or remains selected. The base station BS can then execute write, read or other commands on the selected transponder TR3.

The example shown in FIG. 4 is based on a 3phase1 coding. It goes without saying that other types of coding, in particular those shown in FIG. 3, can also be applied to the arbitration method described in FIG. 4.

As an alternative or in addition, an additional modulation state that does not serve for coding a character can be used for the transmission or coding of the safeguard character. By way of example, in the case of a phase modulation or phase shift keying that usually alternates between two different phase angles, it is possible to introduce a third phase angle for coding the safeguard character.

A circuit arrangement for phase modulation is represented for example in the applicant's published German patent application DE 10158442 A1, which corresponds to U.S. Publication No. 2003/0102961, the entire contents of which are hereby incorporated by reference into the present application. In this case, the change in capacitance is realized in the input circuit with the aid of a varactor to which a control voltage is applied for varying its capacitance by varactor control means in the form of a controllable voltage source.

In order to generate the third phase angle, it is possible, when using a so-called accumulation mode varactor, to apply an identical potential to both varactor terminals. The first and second phase angles are conventionally generated by switching over the polarity of the control voltage present at the varactor.

This additional modulation state is advantageously generated at the points in time at which, as already described, the coding assigned to the safeguard character is inserted within the interval. In this case, the points in time may be ascertained analogously to the determination of the variable CRC_zone as described in FIG. 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for wireless data transmission between a base station and one or more transponders, the method comprising the steps of:
   emitting electromagnetic carrier waves by the base station;
   transmitting data comprising successive characters from a respective transponder by modulation and backscattering of the electromagnetic carrier waves; and
   coding and transmitting a respective one of the characters by the respective transponder within a predefined time interval for coding and transmitting a single character;
   wherein, within at least one of the predefined time intervals, a safeguard character formed from the data to be transmitted is transmitted in addition to the character to be transmitted.

2. The method according to claim 1, wherein the modulation of the transmitted data is a PSK modulation or a ASK modulation.

3. The method according to claim 1, wherein the coding is a 3phase1 coding, an FM0 coding, or an NRZI coding.

4. The method according claim 1, wherein the predefined time interval is predefined by the base station by successive synchronization marks.

5. The method according to claim 4, wherein the successive synchronization marks are generated by field gaps or by a phase reversal of the electromagnetic carrier wave.

6. The method according to claim 1, wherein the safeguard character is part of a cyclic redundancy code formed from the data.

7. The method according to claim 1, wherein the safeguard character is a parity bit.

8. The method according to claim 1, wherein the safeguard character is coded by an additional modulation state that does not code a character.

9. The method according to claim 8, wherein the additional modulation state is generated by driving a varactor in an input circuit of the transponder.

10. The method according to claim 1, wherein the safeguard character is transmitted within the predefined time interval after the character that is to be transmitted.

11. The method according to claim 1, wherein the characters are part of an identification bit sequence which is transmitted from a transponder to the base station during a transponder selection method.

12. The method according to claim 1, wherein the transponder is a passive transponder.

13. The method according to claim 1, wherein the transponder transmits the data comprising successive characters to the base station or another base station.

14. The method according to claim 1, further comprising:
   forming the safeguard character from the data including the successive characters.

15. The method according to claim 1, wherein the safeguard character is transmitted during the transmission of the data.

16. A method for wireless transmission between a base and at least one transponder, the method comprising the steps of:
   determining a coding type;
   forming a safeguard character from payload data; and
   selecting a predefined time interval corresponding to transmission of a single character for transmitting the safeguard data and the payload data based upon the determination of the coding type.

17. The method according to claim 16, further comprising: transmitting the safeguard data and the payload data within the predefined time interval.

18. The method according to claim 16, further comprising: transmitting the safeguard data during transmission of the payload data.

19. A wireless transponder, comprising:
   an execution unit;
   a memory functionally coupled to the execution unit, containing instructions causing the processor to determine a coding type, form a safeguard character from payload data, and select a predefined time interval corresponding to transmission of a single character for transmitting the safeguard data and the payload data; and
   a multiplexer functionally coupled to the execution unit, which combines payload data and safeguard data based upon intervals determined by the execution unit.

20. A method for wireless data transmission between a base station and one or more transponders, the method comprising:
   emitting electromagnetic carrier waves by the base station;
   transmitting data including successive characters from a respective transponder by modulation and backscattering of the electromagnetic carrier waves;
   coding and transmitting a respective one of the characters by the respective transponder within a predefined time interval for coding and transmitting a single character;
   forming a safeguard character from the data including the successive characters; and
   transmitting the safeguard character within a same predefined time interval as the transmitting of the respective one of the characters.

* * * * *